United States Patent
Jarvis et al.

(10) Patent No.: US 12,282,776 B2
(45) Date of Patent: Apr. 22, 2025

(54) HYBRID PARALLELIZED TAGGED GEOMETRIC (TAGE) BRANCH PREDICTION

(71) Applicant: ADVANCED MICRO DEVICES, INC., Santa Clara, CA (US)

(72) Inventors: Anthony Jarvis, Boxborough, MA (US); Thomas Clouqueur, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/708,344

(22) Filed: Mar. 30, 2022

(65) Prior Publication Data

US 2023/0315469 A1 Oct. 5, 2023

(51) Int. Cl.
*G06F 9/38* (2018.01)

(52) U.S. Cl.
CPC .......... *G06F 9/3806* (2013.01); *G06F 9/3848* (2013.01); *G06F 9/3869* (2013.01)

(58) Field of Classification Search
CPC ..... G06F 9/3806; G06F 9/3848; G06F 9/3869
See application file for complete search history.

(56) References Cited

U.S. PATENT DOCUMENTS

| | | | |
|---|---|---|---|
| 3,906,458 A | 9/1975 | Ehlers | |
| 6,189,091 B1 | 2/2001 | Col et al. | |
| 6,550,004 B1 * | 4/2003 | Henry | G06F 9/3848 712/E9.052 |
| 7,093,111 B2 | 8/2006 | Frommer et al. | |
| 7,219,217 B1 * | 5/2007 | Baweja | G06F 9/3848 712/239 |
| 7,689,816 B2 | 3/2010 | Levitan | |
| 7,975,133 B1 | 7/2011 | Olson et al. | |
| 11,275,686 B1 | 3/2022 | McDonald | |
| 2005/0050307 A1 | 3/2005 | Reinhardt et al. | |
| 2006/0026469 A1 | 2/2006 | Yokoi | |
| 2008/0005542 A1 * | 1/2008 | Gschwind | G06F 9/3844 712/239 |
| 2008/0109644 A1 | 5/2008 | Stempel et al. | |
| 2008/0114971 A1 * | 5/2008 | Fontenot | G06F 9/3863 712/E9.035 |
| 2008/0209190 A1 * | 8/2008 | Bhargava | G06F 9/3844 712/240 |
| 2009/0287912 A1 * | 11/2009 | Sendag | G06F 9/3848 712/240 |

(Continued)

OTHER PUBLICATIONS

Seznec, A. TAGE-SC-L Branch Predictors. JILP-Championship Branch Prediction, Jun. 2014, [retrieved on Aug. 8, 2023]. Retrieved from the Internet <URL: https://inria.hal.science/hal-01086920>.*

(Continued)

*Primary Examiner* — Shawn Doman (57) ABSTRACT

Hybrid parallelized tagged geometric (TAGE) branch prediction, including: selecting, based on a branch instruction, a first plurality of counts from at least one TAGE table; selecting, based on the branch instruction, a second plurality of counts from at least one non-TAGE branch prediction table; generating, based on the first plurality of counts and a second plurality of counts; and wherein selecting the first plurality of counts and selecting the second plurality of counts are performed during a same branch prediction pipeline stage.

20 Claims, 8 Drawing Sheets

(56) References Cited

U.S. PATENT DOCUMENTS

| | | | |
|---|---|---|---|
| 2011/0082983 A1 | 4/2011 | Koktan | |
| 2011/0087866 A1 | 4/2011 | Shah et al. | |
| 2012/0166775 A1* | 6/2012 | Krishnamurthy | G06F 9/3848 |
| | | | 712/E9.045 |
| 2013/0007425 A1* | 1/2013 | Cantin | G06F 9/3848 |
| | | | 712/240 |
| 2015/0032997 A1 | 1/2015 | Eickemeyer et al. | |
| 2015/0046691 A1 | 2/2015 | Heil et al. | |
| 2015/0331691 A1 | 11/2015 | Levitan et al. | |
| 2016/0306632 A1* | 10/2016 | Bouzguarrou | G06F 9/3848 |
| 2017/0010820 A1 | 1/2017 | Day et al. | |
| 2017/0322810 A1* | 11/2017 | Navada | G06F 9/3001 |
| 2017/0344370 A1 | 11/2017 | Levitan et al. | |
| 2017/0371670 A1* | 12/2017 | Bonanno | G06F 9/3806 |
| 2018/0136937 A1 | 5/2018 | Yang et al. | |
| 2018/0314525 A1 | 11/2018 | Sadasivam et al. | |
| 2019/0004803 A1* | 1/2019 | Al Sheikh | G06F 9/3806 |
| 2019/0361707 A1* | 11/2019 | Vougioukas | G06F 9/3806 |
| 2020/0073669 A1* | 3/2020 | Clouqueur | G06F 9/3806 |
| 2020/0104137 A1* | 4/2020 | Natarajan | G06F 9/3848 |
| 2020/0110615 A1* | 4/2020 | Ishii | G06F 9/3005 |
| 2021/0232400 A1 | 7/2021 | Ishii et al. | |
| 2022/0197662 A1* | 6/2022 | Soundararajan | G06F 9/3818 |
| 2023/0315468 A1 | 10/2023 | Jarvis et al. | |
| 2023/0315475 A1 | 10/2023 | Jarvis et al. | |

OTHER PUBLICATIONS

Schlais et al., "BADGR: A Practical GHR Implementation for TAGE Branch Predictors," 2016 IEEE 34th International Conference on Computer Design (ICCD), Oct. 2-5, 2016, Scottsdale, AZ, USA, Date Added to IEEE Xplore: Nov. 24, 2016, DOI: 10.1109/ICCD.2016.7753338, 8 pages.

Seznec et al., "A case for (partially) TAgged GEometric history length branch prediction," The Journal of Instruction-Level Parallelism 8 (2006), published Feb. 2006, 23 pages.

Michaud, "An Alternative TAGE-like Conditional Branch Predictor," ACM Transactions on Architecture and Code Optimization (TACO), vol. 15, Issue 3, Article No. 30, https://doi.org/10.1145/3226098, Published: Aug. 28, 2018, 25 pages.

Seznec, "A 256 Kbits L-TAGE Branch Predictor," Journal of Instruction-Level Parallelism (JILP) Special Issue: The Second Championship Branch Prediction Competition (CBP-2) 9 (2007), 6 pages.

Seznec, "The L-TAGE Branch Predictor," Journal of Instruction-Level Parallelism 9, May 2007, Submitted Apr. 2007; published May 2007, 13 pages.

* cited by examiner

| TAGE Table 500 | | |
|---|---|---|
| Counter 502 | Tag 504 | Useful Bit 506 |
| $Ctr_0$ | $Tag_0$ | $U_0$ |
| $Ctr_1$ | $Tag_1$ | $U_1$ |
| ... | ... | ... |
| $Ctr_{n-1}$ | $Tag_{n-1}$ | $U_{n-1}$ |

HYBRID PARALLELIZED TAGGED GEOMETRIC (TAGE) BRANCH PREDICTION

BACKGROUND

Tagged geometric (TAGE) branch predictors use tagged table entries of counters to predict whether a branch of a branch instruction will be taken or not taken. In order to increase the reliability of a generated branch prediction, the TAGE branch prediction is compared to the result of other branch prediction approaches to see if the TAGE branch prediction should be overridden. Although this increases the accuracy of the resulting branch prediction, it requires additional branch prediction pipeline stages, and therefore additional time, to generate the resulting branch prediction.

DETAILED DESCRIPTION

Tagged geometric (TAGE) branch predictors use tagged table entries of counters to predict whether a branch of a branch instruction will be taken or not taken. In order to increase the reliability of a generated branch prediction, the TAGE branch prediction is compared to the result of other branch prediction approaches to see if the TAGE branch prediction should be overridden. Although this increases the accuracy of the resulting branch prediction, it requires additional branch prediction pipeline stages, and therefore additional time, to generate the resulting branch prediction.

The present specification sets forth various implementations for hybrid parallelized tagged geometric (TAGE) branch prediction. In some implementations, a method of hybrid parallelized tagged geometric (TAGE) branch prediction includes selecting, based on a branch instruction, a first plurality of counts from at least one TAGE table and selecting, based on the branch instruction, a second plurality of counts from at least one non-TAGE branch prediction table. The method also includes generating, based on the first plurality of counts and a second plurality of counts, a branch prediction. Selecting the first plurality of counts and selecting the second plurality of counts are performed during a same branch prediction pipeline stage.

In some implementations, the method also includes: generating, based on the second plurality of counts, a bit vector, selecting, for each count of the first plurality of counts, a corresponding bit of a plurality of bits from the bit vector, and generating, based on the bit vector, a predicted direction for the branch instruction. In some implementations, the at least one non-TAGE branch prediction table comprises at least one at least one statistical corrector predictor (SCP) table. In some implementations, the method also includes: calculating, for the at least one TAGE table, a corresponding hash of at least one hash and calculating, for the at least one non-TAGE branch prediction table, a corresponding hash pair of at least one hash pair. In some implementations, calculating the corresponding hash of the at least one hash and calculating the corresponding hash pair of the at least one hash pair are performed during a same branch prediction pipeline stage. In some implementations, a first hash of each hash pair is based on a first TAGE direction bit value and a second hash of each hash pair is based on a second TAGE direction bit value. In some implementations, the first plurality of counts is selected based on the at least one of hash and the second plurality of counts is selected based on the at least one hash pair.

The present specification also describes various implementations of a branch predictor for hybrid parallelized tagged geometric (TAGE) branch prediction. Such a branch predictor performs steps including selecting, based on a branch instruction, a first plurality of counts from at least one TAGE table and selecting, based on the branch instruction, a second plurality of counts from at least one non-TAGE branch prediction table. The steps also include generating, based on the first plurality of counts and a second plurality of counts. Selecting the first plurality of counts and selecting the second plurality of counts are performed during a same branch prediction pipeline stage.

In some implementations, the steps also include: generating, based on the second plurality of counts, a bit vector, selecting, for each count of the first plurality of counts, a corresponding bit of a plurality of bits from the bit vector, and generating, based on the bit vector, a predicted direction for the branch instruction. In some implementations, the at least one non-TAGE branch prediction table comprises at least one at least one statistical corrector predictor (SCP) table. In some implementations, the steps also include: calculating, for the at least one TAGE table, a corresponding hash of at least one hash and calculating, for the at least one non-TAGE branch prediction table, a corresponding hash pair of at least one hash pair. In some implementations, calculating the corresponding hash of the at least one hash and calculating the corresponding hash pair of the at least one hash pair are performed during a same branch prediction pipeline stage. In some implementations, a first hash of each hash pair is based on a first TAGE direction bit value and a second hash of each hash pair is based on a second TAGE direction bit value. In some implementations, the first plurality of counts is selected based on the at least one of hash and the second plurality of counts is selected based on the at least one hash pair.

Also described in this specification are various implementations of an apparatus for hybrid parallelized tagged geometric (TAGE) branch prediction. Such an apparatus includes computer memory and a processor operatively coupled to the computer memory. The processor includes a branch predictor performing steps including: selecting, based on a branch instruction, a first plurality of counts from at least one TAGE table and selecting, based on the branch instruction, a second plurality of counts from at least one non-TAGE branch prediction table. The steps also include generating, based on the first plurality of counts and a second plurality of counts. Selecting the first plurality of counts and selecting the second plurality of counts are performed during a same branch prediction pipeline stage.

In some implementations, the steps also include: generating, based on the second plurality of counts, a bit vector, selecting, for each count of the first plurality of counts, a corresponding bit of a plurality of bits from the bit vector, and generating, based on the bit vector, a predicted direction for the branch instruction. In some implementations, the at least one non-TAGE branch prediction table comprises at least one at least one statistical corrector predictor (SCP) table. In some implementations, the steps also include: calculating, for the at least one TAGE table, a corresponding hash of at least one hash and calculating, for the at least one non-TAGE branch prediction table, a corresponding hash pair of at least one hash pair. In some implementations, calculating the corresponding hash of the at least one hash and calculating the corresponding hash pair of the at least one hash pair are performed during a same branch prediction pipeline stage. In some implementations, a first hash of each hash pair is based on a first TAGE direction bit value and a second hash of each hash pair is based on a second TAGE direction bit value.

The following disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows include implementations in which the first and second features are formed in direct contact, and also include implementations in which additional features be formed between the first and second features, such that the first and second features are not in direct contact. Further, spatially relative terms, such as "beneath," "below," "lower," "above," "upper," "back," "front," "top," "bottom," and the like, are used herein for ease of description to describe one element or feature's relationship to another element(s) or feature(s) as illustrated in the figures. Similarly, terms such as "front surface" and "back surface" or "top surface" and "back surface" are used herein to more easily identify various components, and identify that those components are, for example, on opposing sides of another component. The spatially relative terms are intended to encompass different orientations of the device in use or operation in addition to the orientation depicted in the figures.

Figure 1:
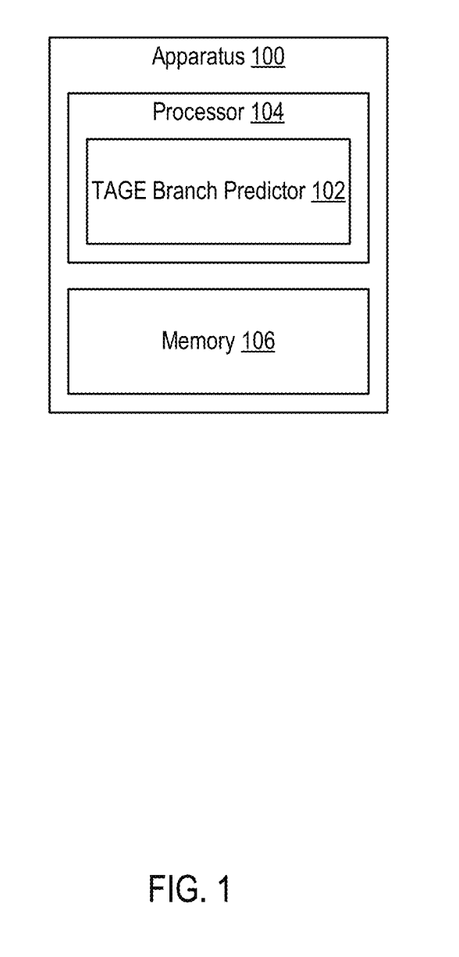
FIG. 1 is a block diagram of an example apparatus for hybrid parallelized tagged geometric (TAGE) branch prediction according to some implementations.

FIG. 1 is a block diagram of an apparatus 100 including an example tagged geometric (TAGE) branch predictor 102 for hybrid parallelized tagged geometric (TAGE) branch prediction according to some implementations. The apparatus 102 can be implemented as a variety of computing devices, including personal computers, mobile devices, servers, systems-on-a-chip (SoCs), hardware accelerators, and the like. The apparatus 100 is a processor 104 such as a central processing unit (CPU) or other processor 104 as can be appreciated. The apparatus 100 also includes memory 106 operatively coupled to the processor 104. The memory 106 includes, for example, volatile memory such as random access memory (RAM), non-volatile memory, disk-based storage, or combinations thereof.

The processor 104 includes a TAGE branch predictor 102 for hybrid parallelized tagged geometric (TAGE) branch prediction according to some implementations described in further detail below. The TAGE branch predictor 102 performs a branch prediction on instructions provided to the processor 104 for execution (e.g., instructions loaded from memory 106). The TAGE branch predictor 102 uses a TAGE algorithm to perform branch prediction as will be described in further detail below.

Figure 2:
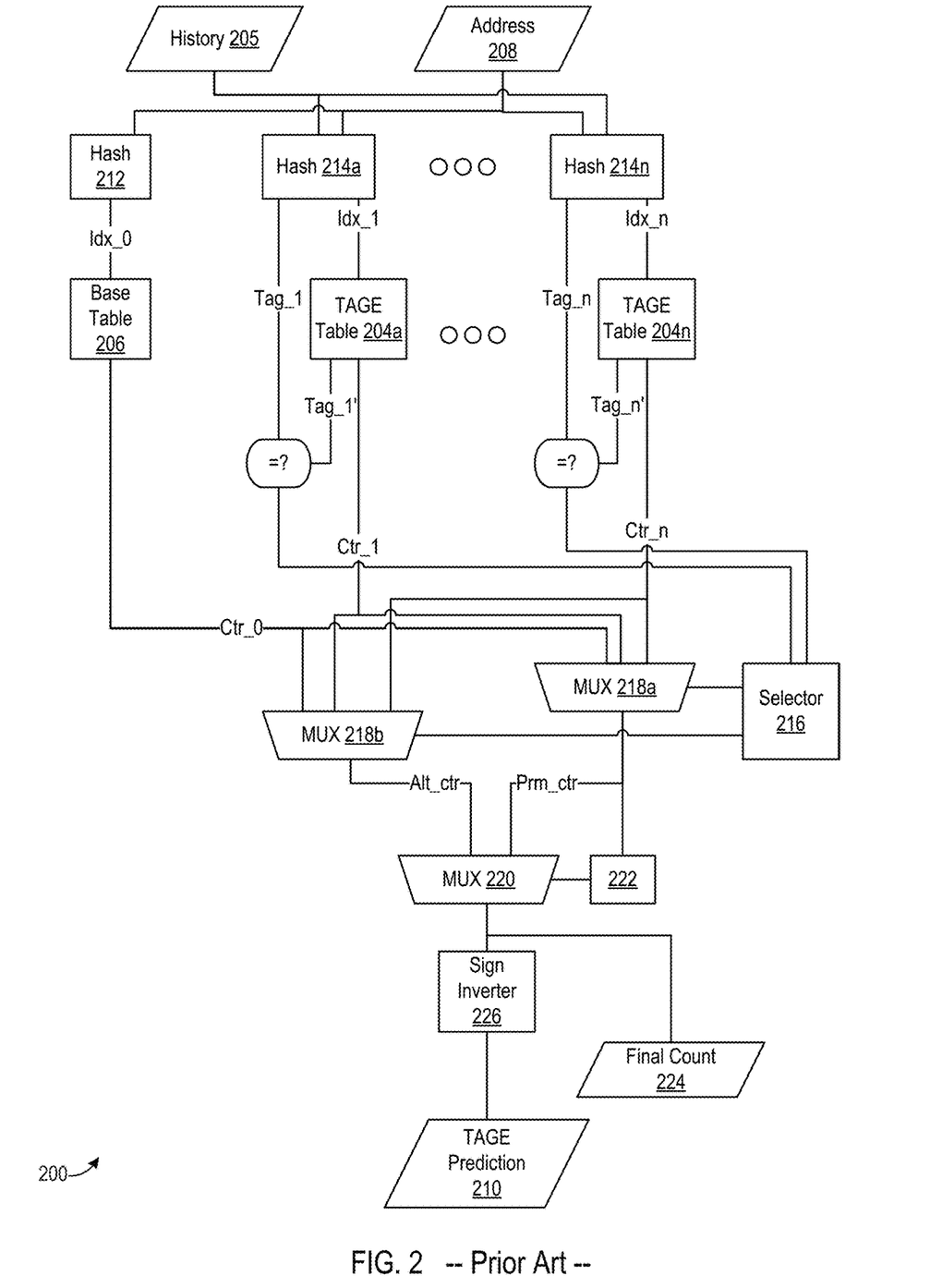
FIG. 2 is a block diagram of an example TAGE branch predictor according to some implementations.
Figure 5:
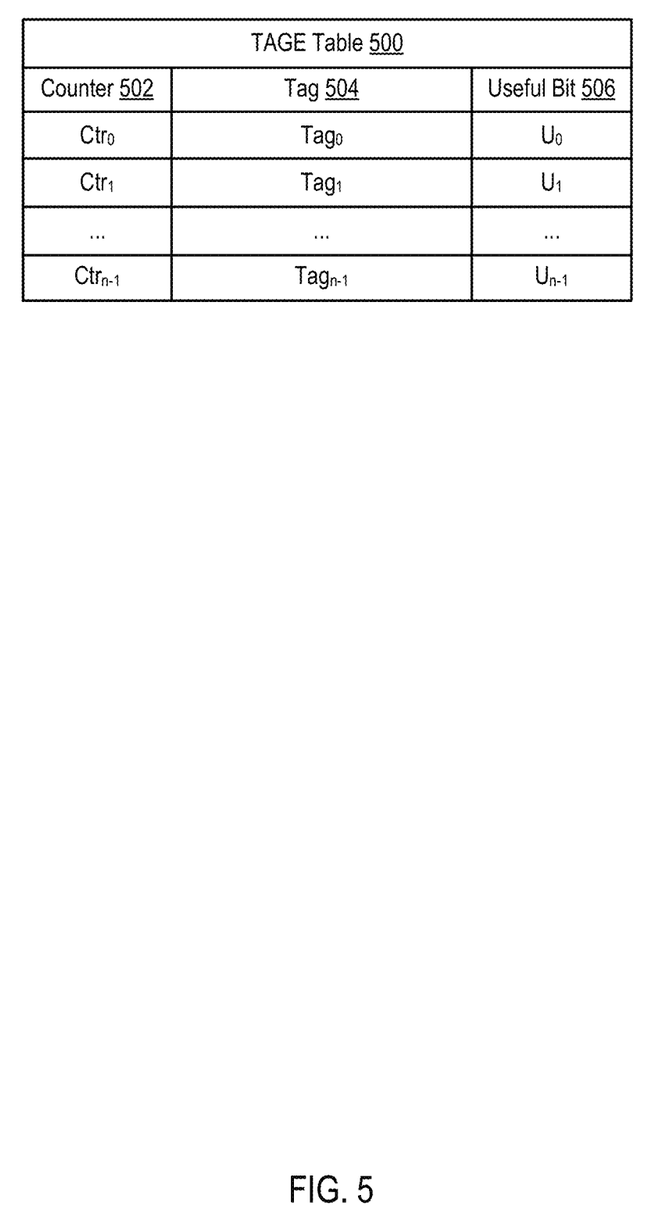
FIG. 5 is a diagram of an example TAGE table entry according to some implementations.

FIG. 2 is a diagram of an example tagged geometric (TAGE) branch predictor according to known solutions in the art. The TAGE branch predictor 200 maintains multiple TAGE tables 204a-n. Each TAGE table 204a-n is a logical table that includes a plurality of entries. As will be described in further detail below, each TAGE table 204a-n is indexed based on an address 208 of a branch instruction subject to branch prediction and an increasingly long portion of history 205, with the utilized lengths of branch prediction history increasing according to a geometric sequence. As is shown in the example TAGE table 500 of FIG. 5, each entry of the TAGE table 500 includes a counter 502 and a tag 504. Each entry also includes a useful bit 506 that factors in preventing modification of the corresponding entry. The TAGE branch predictor 200 also maintains a base table 206, a logical table indexed using the address 208 of the branch instruction with each entry of the base table 206 storing a counter 502 but not including tags 504.

As will be appreciated by one skilled in the art, the counters 502 for the TAGE tables 204a-n and base table 206 (e.g., a base TAGE table) are updated depending on the accuracy of a generated TAGE prediction 210 for a given branch instruction. A TAGE prediction 210 is an indication of whether it is predicted that a branch of a branch instruction will be taken or not taken. For example, in some implementations, the TAGE prediction 210 is embodied as a single bit, with a "1" indicating a prediction that the branch will be taken and a "0" indicating a prediction that the branch will not be taken. After execution of a branch instruction, the counters 502 for entries in the TAGE table 204a-n and base table 206 selected and used in generating the TAGE prediction 210 are updated accordingly. For example, where the TAGE prediction 210 predicts a taken branch and the branch was taken on execution, the counters 502 are incremented. As another example, where the TAGE prediction 210 predicts a non-taken branch and the branch was not taken, the counters 502 are decremented. As a further example, where the TAGE prediction 210 predicts a taken branch and the branch was not taken on execution, the counters 502 are decremented. As a further example, where the TAGE prediction 210 predicts a non-taken branch and the branch was taken, the counters 502 are incremented.

As is described above, the base table 206 and TAGE tables 204a-n are indexed using different portions of data. The base table 206 is indexed using an address 208 of the branch instruction for which a TAGE prediction 210 is to be generated. To generate the index for the base table 206, shown as Idx_0, the address 208 is provided as input to a hash function shown as hash 212. The hash function implemented by hash 212 is any function as can be appreciated that generates, based on the address 208, a value usable in indexing the base table 206.

To generate the indexes for the TAGE tables 204a-n, shown as Idx_1-Idx_n, the address 208 and different portions of history 205 are provided as input to hash functions shown as hashes 214a-n. Given a history 205 of multiple entries, each hash 214a-n is provided a number of entries increasing according to a geometric sequence. In some implementations, the history 205 includes a direction history describing the most recently taken branches. For example, the direction history includes some number of entries with each entry indicating whether a branch was taken or not taken. As described herein, a "direction" for a branch instruction describes whether or not a branch was taken or not taken. Accordingly, a "predicted direction" for a branch instruction as the phrase is used herein is a prediction as to whether a branch instruction was predicted to be taken or not taken. In some implementations, the history 205 includes a path history with each entry describing a most recently executed instruction. In some implementations, the history 205 includes a local history describing whether the most recent executions of the branch instruction (e.g., corresponding to the address 208) resulted in a taken or non-taken branch. One skilled in the art will appreciate that, in some implementations, the history 205 includes combinations of the various histories described above.

As shown in FIG. 2, the address 208 and portions of history 205 used for each TAGE table 204a-n are used to generate, in addition to an index, tags shown as Tag_1-n. Although Tag_1-Tag_n are shown as output from a respective hash 214a-n for clarity, one skilled in the art will appreciate that the algorithms or calculations used to generate the indexes are different from those used to generate the tags such that the resulting Tag_1-Tag_n is different than the Idx_1-Idx_n.

Each calculated Tag_1-Tag_n is compared to the tag 504 of the entry identified by the Idx_1-Idx_n, shown as Tag_1'-Tag_n', with the results of the comparison provided to a selector 216. The counters 502 of the entries identified by the Idx_0, Idx_1-Idx_n, shown as Ctr_0, Ctr_1, Ctr_n, are provided to multiplexers 218a,b.

The selector 216 receives, as input, signals corresponding to each TAGE table 204a-n indicating whether the respective TAGE table 204a-n has a match between a calculated Tag_1-Tag_n and a stored tag 504 Tag_1'-Tag_n'. The selector 216 outputs, as a selection signal to the MUX 218a, an indication of a highest order TAGE table 204a-n with a match. The order of a TAGE table 204a-n describes the amount of history used to index the TAGE table 204a-n. For example, a TAGE table 204a is indexed using the lowest amount of history, and is therefore the lowest order TAGE table 204a-n, while a TAGE table 204n is indexed using the highest amount of history, and is therefore the highest order TAGE table 204a-n. Where no TAGE table 204a-n has a match, the selector 216 outputs a selection signal corresponding to the base table 206. The selector 216 outputs, as a selection signal to the MUX 218b, an indication of the second highest order TAGE table 204a-n with a match. Where no TAGE table 204a-n, or only a single TAGE table 204a-n has a match, the selector 216 outputs a selection signal corresponding to the base table 206.

Each MUX 218a,b outputs into a MUX 220 one of the counters 502 Ctr_0, Ctr_1-Ctr_n, shown as Prm_ctr and Alt_ctr, respectively, depending on the selection signal provided by the selector 216. Prm_ctr is also provided as input to confidence logic 222. The confidence logic 222 provides an indication of the strength or confidence of an input counter 502. In some implementations, the confidence is based on an absolute value of the counter 502. In some implementations, the confidence is based on whether the counter 502 is equal to one or more predefined possible values for the counter 502. Consider an example with a three bit counter 502 with one bit reserved as a sign bit. In some implementations, the confidence logic 222 outputs a "0" or other indication of non-confidence where the input counter 502 is equal to zero or negative one, and outputs a "1" or other indication of confidence where the input counter 502 is equal to another value. Thus, higher order negative or positive values correspond to a higher degree of confidence in the input counter 502.

Where the confidence logic 222 outputs an indication of confidence, the MUX 220 outputs the Prm_ctr as the final count 224. Where the confidence logic 222 outputs an indication of non-confidence, the MUX 220 outputs the Alt_ctr as the final count 224. The final count 224 is also provided as input to a sign inverter 226 that outputs, as the TAGE prediction 210 the inverse of the sign bit for the final count 224. Thus, a positive final count 224 having a "0" sign bit will result in a TAGE prediction 210 of "1" indicating a predicted taken branch. A negative final count 224 having a "1" sign bit will result in a TAGE prediction 210 of "0" indicating a predicted non-taken branch.

Figure 3:
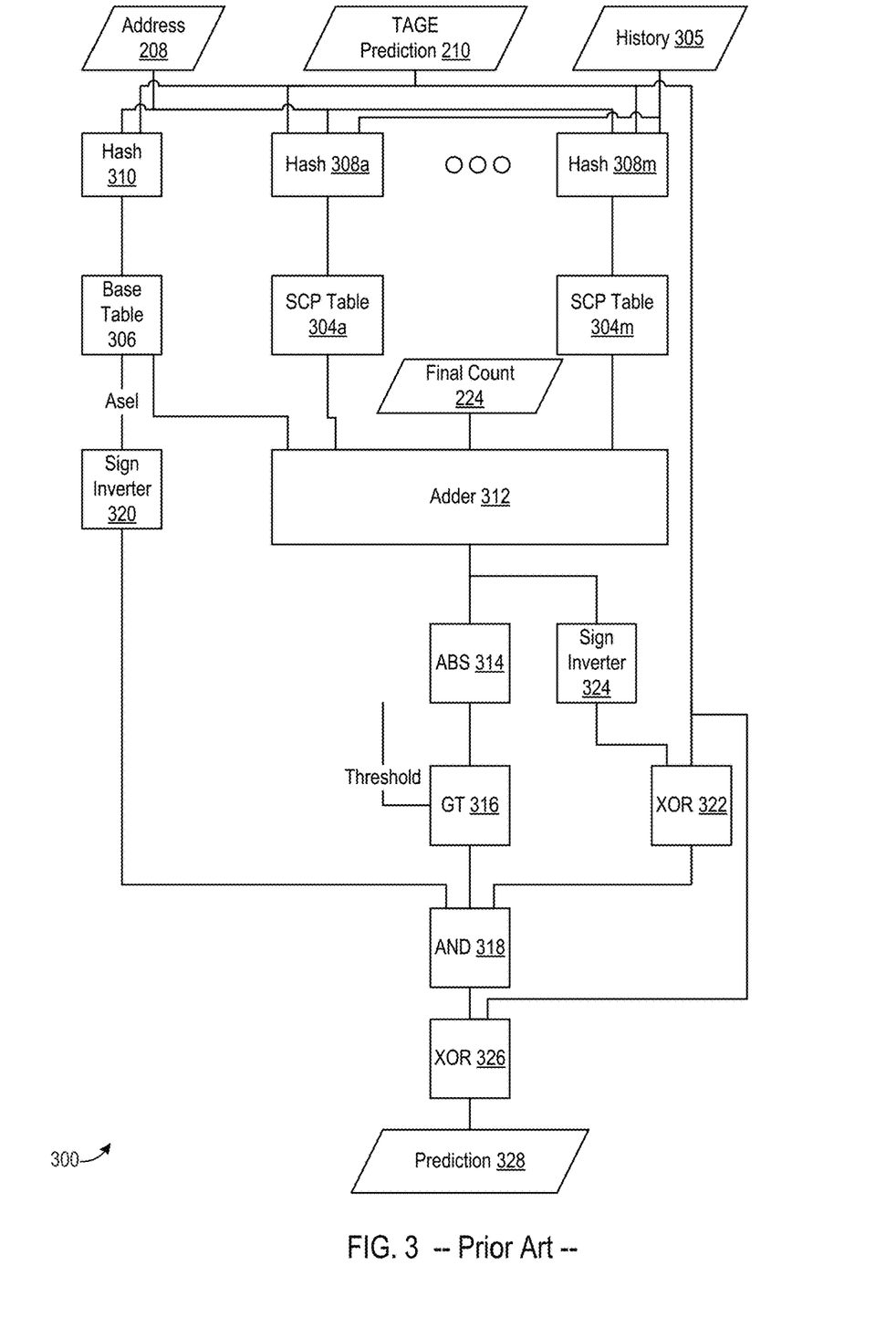
FIG. 3 is a block diagram of an example statistical corrector predictor (SCP) according to some implementations.

In some existing solutions, the output from the TAGE branch predictor 200 (e.g., the TAGE prediction 210 and the final count 224) are provided as inputs to a statistical corrector predictor (SCP) 300 as shown in FIG. 3. In some implementations, the SCP 300 is implemented as a hashed perceptron, a geometric history length (GEHL) predictor, or other branch predictor as can be appreciated. The SCP 300 is another type of branch predictor that uses indexed non-tagged tables of counters, shown as SCP tables 304a-m indexed using an address 208 and different amounts of history 305. One skilled in the art will appreciate that the number of SCP tables 304a-m may include any number of SCP tables 304a-m that may be adjusted according to design considerations, and may differ from a number of TAGE tables 204a-n. The amounts of history 305 used to index each SCP Table 304a-m increases according to some function, not necessarily a geometric sequence as with the TAGE branch predictor 200. In some implementations, the history 305 used by the SCP 300 matches the history 205 used by the TAGE branch predictor 200. In other implementations, the history 305 used by the SCP 300 is different from the history 205 used by the TAGE branch predictor 200. As an example, in some implementations, the TAGE branch predictor 200 uses, as history 205, direction history and path history, while the SCP 300 uses, as history 305, direction history and local history. One skilled in the art will appreciate that various combinations of history 205 and history 305 are contemplated within the scope of the present disclosure.

The SCP tables 304a-m are also indexed using the TAGE prediction 210 from the TAGE branch predictor 200. Thus, to generate an index for each SCP table 304a-m, the address 208, TAGE prediction 210, and some portion of history 305 are provided to a respective hash 308a-m. The address 208 and TAGE prediction 210 are also used to index a base table 306 using a hash 310. The base table 306 is an indexed table with each entry including a respective counter and Asel value. The Asel value is a value indicating whether or not the corresponding entry should override a TAGE prediction 210.

The counters from the identified base table 306 and SCP table 304a-m entries and the final count 224 are provided as input to an adder 312. The sum output by the adder 312 is provided to absolute value (ABS) 314 logic, thereby providing the absolute value of the sum of the adder 312 to greater-than (GT) logic 316. GT 316 compares the input value (e.g., the absolute value of the sum provided by the adder 312) to some defined threshold and outputs a "1" if the input is greater than the threshold and a "0" if the input is less than the threshold. The output of GT 316 is provided to AND 318, an AND gate as will be appreciated by one skilled in the art.

AND 318 also accepts, as input, the inverse sign of the Asel value from the identified base table 306 entry, output by sign inverter 320. Also input to AND 318 is a result of an exclusive-OR operation performed by XOR 322. The XOR operation is applied to the TAGE prediction 210 and the inverse of the sign of the sum output by the adder 312 (provided via sign inverter 324). The TAGE prediction 210 and the output of AND 318 are provided to XOR 326 to generate a prediction 328. The prediction 328 is based on both the TAGE branch predictor 200 and the SCP 300, effectively allowing the SCP 300 to support or override the TAGE prediction 210.

One skilled in the art will appreciate that by using the SCP 300 in conjunction with the TAGE branch predictor 200, the resulting prediction 328 is more accurate than the TAGE prediction 210 generated using only a single branch prediction approach. However, one skilled in the art will appreciate that the combination described above passing the output of the TAGE branch predictor 200 to the SCP 300 in order to generate the final prediction 328 greatly increases the number of branch prediction cycles required to perform branch prediction. A complete TAGE prediction 210 must be generated, requiring some number of branch prediction cycles, and the result must then be provided to the SCP 300, requiring further branch prediction cycles.

Figure 4:
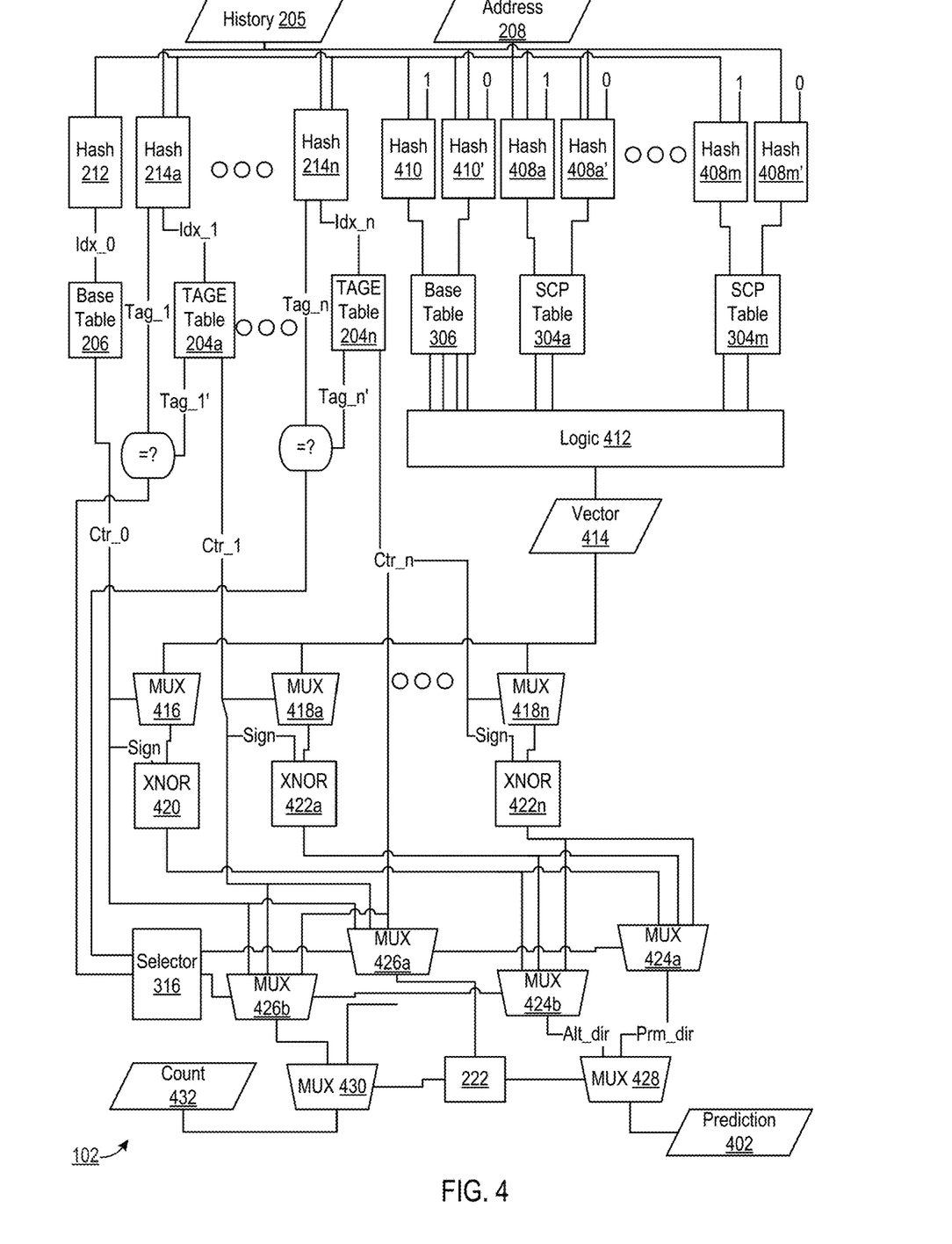
FIG. 4 is a block diagram of an example branch predictor for hybrid parallelized tagged geometric (TAGE) branch prediction according to some implementations.

To address these concerns, FIG. 4 shows a branch predictor 102 for hybrid parallelized tagged geometric (TAGE) branch prediction according to some implementations of the present disclosure. The branch predictor 102 implements TAGE and SCP branch prediction in parallel, reducing the number of branch prediction cycles required to generate a branch prediction compared to serializing the TAGE and SCP predictions. Similar to FIG. 2, the branch predictor 102 includes TAGE tables 204a-n and a base table 206. An index for the base table 206, shown as Idx_0, is generated using a hash 212 that accepts, as input, the address 208 of a branch instruction for which a prediction 402 is generated. Indexes for the TAGE tables 204a-n, shown as Idx_1-Idx_n, are generated using hashes 214a-n that accept, as input, the address 208 and portions of history 205 of geometrically increasing size.

Similar to FIG. 3, the branch predictor 102 includes a base table 306 and SCP tables 304a-m. In contrast to FIG. 3, where each of the base table 306 and SCP tables 304a-m are queried once using a single index, each of the base table 306 and SCP tables 305a-m are each queried twice using different indexes. The base table 306 is queried using a first index generated by hash 410 and using a second index using a hash 410'. The hash 410 and hash 410' are similar to the hash 310 in that they each generate an index for the base table 306 based on an input address 208. The hash 410 and hash 410' are different from the hash 310 as they do not accept any input TAGE prediction 210 as no such TAGE prediction 210 has been generated. Instead, the hash 410 accepts a TAGE direction bit value of "1" and the hash 410' accepts a TAGE direction bit value of "0." The different TAGE direction bit values serve to simulate the result of an input TAGE prediction 210 that would otherwise be used to index the base table 306 were it queried after generating a TAGE prediction 210. Thus, the use of the different TAGE direction bit values addresses a shortcoming of performing the statistical corrector predictor without an existing TAGE prediction 210 as an input. The SCP tables 304a-m are each queried twice using indexes from respective hashes 408a-m and respective hashes 408a'-308m'. Each of the hashes 408a-m and hashes 408a'-308m' accept, as input, the address 208 and different portions of history 205, as well as alternate TAGE direction bit values for each hash pair.

Although the hashes of FIG. 4 are each shown as logically coupled to a same history 205 for clarity, it is understood that in some implementations, the types of history used to index the TAGE tables 204a-n will differ from the types of history used to index the base table 306 and SCP tables 304a-m. Moreover, one skilled in the art will appreciate that, though different portions of history 205 will be used to index the SCP tables 304a-m, in some implementations the same portion of history 205 will be used for corresponding pairs of hashes. For example, the same portion of history 205 will be provided to the hash 408a and the hash 408a'. A portion of history 205 differing from that provided to the hash 408a and the hash 408a' will be identically provided to the hash 408m and hash 408m'.

The base table 306 provides, as output to logic 412, a counter and an Asel value for each received index (e.g., two counters and two Asel values). The SCP tables 304a-m provide, as output to the logic 412, a counter for each index received input (e.g., two counters). Logic 412 generates, as output, a vector 414. The particular operations and steps used to generate the vector 414 are customizable depending on design considerations.

The vector 414 is a bit vector with each entry corresponding to a particular possible counter value for counters in the base table 206, TAGE tables 204a-n, the base table 306, and SCP tables 304a-m. For example, assuming that the branch predictor 102 uses three-bit counters having eight possible values, the vector 414 is a bit vector with eight entries. Each index in the bit vector corresponds to a possible value for the counters. For example, for vector 414 of N entries, index "0" will correspond to a lowest possible counter value and index "N−1" will correspond to a highest possible counter value. A set entry in the vector 414 (e.g., having a bit value of "1") indicates that the corresponding counter value, if output from a base table 206 or TAGE table 204a-n (e.g., as Ctr_0, Ctr_1-Ctr_n), should be overridden, as will be described below.

The vector 414 is output to a MUX 416 and MUXes 418a-n. Each MUX 416,318a-n outputs a bit value of the vector 414 corresponding to the counter values Ctr_0, Ctr_1-Ctr_n provided as selection signals. The output of each MUX 416,318a-n is provided, as input, to a respective exclusive-NOR (XNOR) logic shown as XNOR 420,322a-n. Each XNOR 420,322a-n also accepts, as input, a sign bit for the corresponding counter Ctr_0, Ctr_1-Ctr_n.

The output of each XNOR 420,322a-n is provided to a MUX 424a,b. Thus, each MUX 424a,b accepts, as input, a bit value each corresponding to either the base table 206 or a TAGE table 204a-n indicating a predicted direction for the branch instruction. The branch predictor 102 implements a selector 216 to output, as a selection signal to the MUX 424a, an indication of a highest order of the TAGE tables 204a-n having a match between a calculated Tag_1-Tag_n and a stored Tag_1'-Tag_n. In the event of no match, a selection signal indicating the base table 206 is output. The selector 216 outputs, as a selection signal to the MUX 424b, an indication of a second highest order of the TAGE tables 204a-n having a match between a calculated Tag_1-Tag_n and a stored Tag_1'-Tag_n. In the event of no match or only a single match, a selection signal indicating the base table 206 is output.

The selector 216 similarly outputs selection signals to a MUX 426a and 426b. Each MUX 426a,b accepts, as input, the counters output by the base table 206 and TAGE tables 204a-n (e.g., Ctr_0, Ctr_1-Ctr_n). Each MUX 426a,b outputs a counter corresponding to the selection signals from the selector 216. The branch prediction bits from the MUX 424a,b, shown as Prm_dir and Alt_dir, respectively, are provided as input to a MUX 428. The output of the MUX 428 serves as the final prediction 402, with a "1" indicating a predicted taken branch and a "0" indicating a predicted untaken branch.

The output of the MUX 426a, representing a particular stored counter value, is provided to confidence logic 222. The output of the confidence logic 222 serves as a selection signal for the MUX 428 and a MUX 430. The output of the MUX 430 is a counter value corresponding to the prediction 402, shown as count 432.

As will be appreciated by one skilled in the art, the branch predictor 102 allows for functionality associated with the TAGE branch predictor 200 and the SCP 300 to be performed in parallel. Where the branch predictor 102 implements a staged pipeline for branch predictions, particular groups of operations are performed during the same branch prediction pipeline stage. For example, generating the hashes used by the branch predictor 102 (e.g., those values generated by the hash 212, hash 214a-n, hash 410, hash 410', hash 408a-308m, and hash 408a'-308m') is performed during a same branch prediction pipeline stage. As another example, entries or values from the tables of the branch predictor 200 (e.g., the base table 206, TAGE tables 204a-n, base table 306, and SCP tables 304a-m) are loaded during a same pipeline stage (e.g., using the indexes generated during the previous branch prediction pipeline stage.

In some implementations, the branch predictor 102 of FIG. 4 is implemented in a computer 600. For example, the branch predictor 102 is implemented in at least one processor 602. In addition to at least one processor 602, the computer 600 of FIG. 6 includes random access memory (RAM) 604 which is connected through a high speed memory bus 606 and bus adapter 608 to processor 602 and to other components of the computer 600. Stored in RAM 604 is an operating system 610. The operating system 610 in the example of FIG. 6 is shown in RAM 604, but many components of such software typically are stored in non-volatile memory also, such as, for example, on data storage 612, such as a disk drive.

Figure 6:
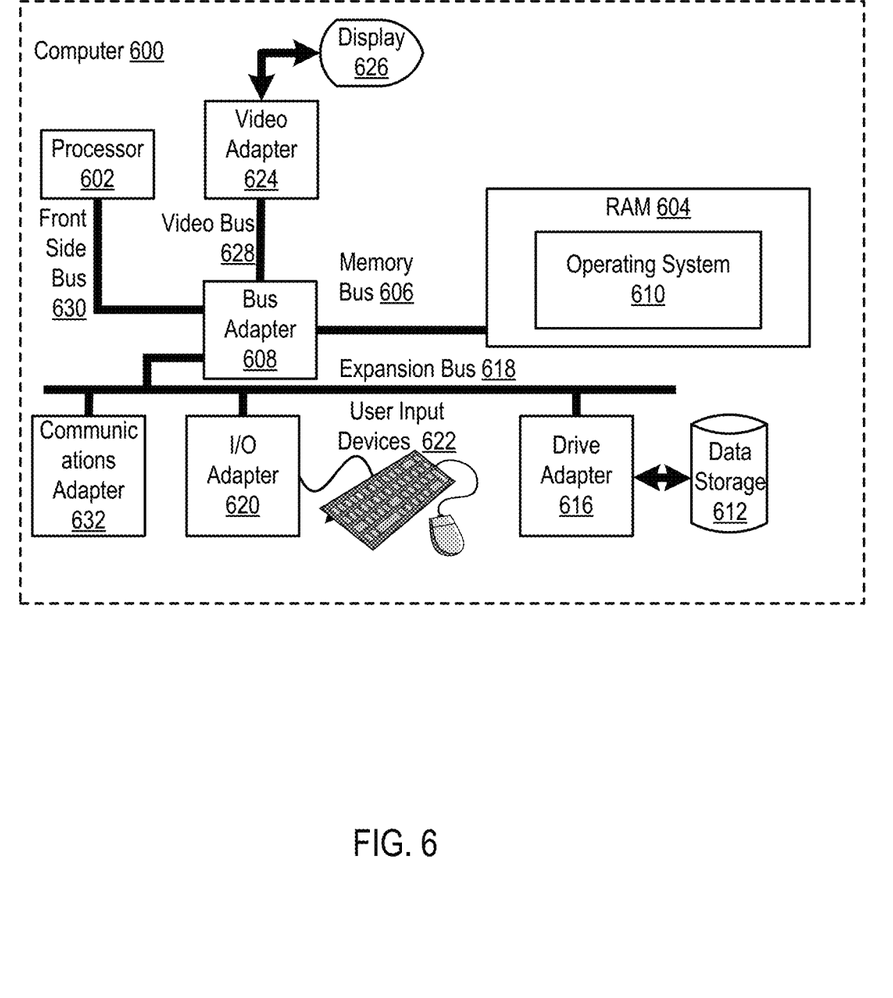
FIG. 6 is a block diagram of an example computer for hybrid parallelized tagged geometric (TAGE) branch prediction according to some implementations.

The computer 600 of FIG. 6 includes disk drive adapter 616 coupled through expansion bus 618 and bus adapter 608 to processor 602 and other components of the computer 600. Disk drive adapter 616 connects non-volatile data storage to the computer 600 in the form of data storage 612. Such disk drive adapters include Integrated Drive Electronics (IDE') adapters, Small Computer System Interface (SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 600 of FIG. 6 includes one or more input/output ('I/O') adapters 620. I/O adapters implement user-oriented input/output through, for example, software drivers and computer hardware for controlling output to display devices such as computer display screens, as well as user input from user input devices 622 such as keyboards and mice. The example computer 600 of FIG. 6 includes a video adapter 624, which is an example of an I/O adapter specially designed for graphic output to a display device 626 such as a display screen or computer monitor. Video adapter 624 is connected to processor 602 through a high speed video bus 628, bus adapter 608, and the front side bus 630, which is also a high speed bus.

The exemplary computer 600 of FIG. 6 includes a communications adapter 632 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters 632 implement the hardware level of data communications through which one computer sends data communications to another computer, directly or through a data communications network. Such communication adapters 632 include modems for wired dial-up communications, Ethernet (IEEE 802.3) adapters for wired data communications, and 802.11 adapters for wireless data communications.

Figure 7:
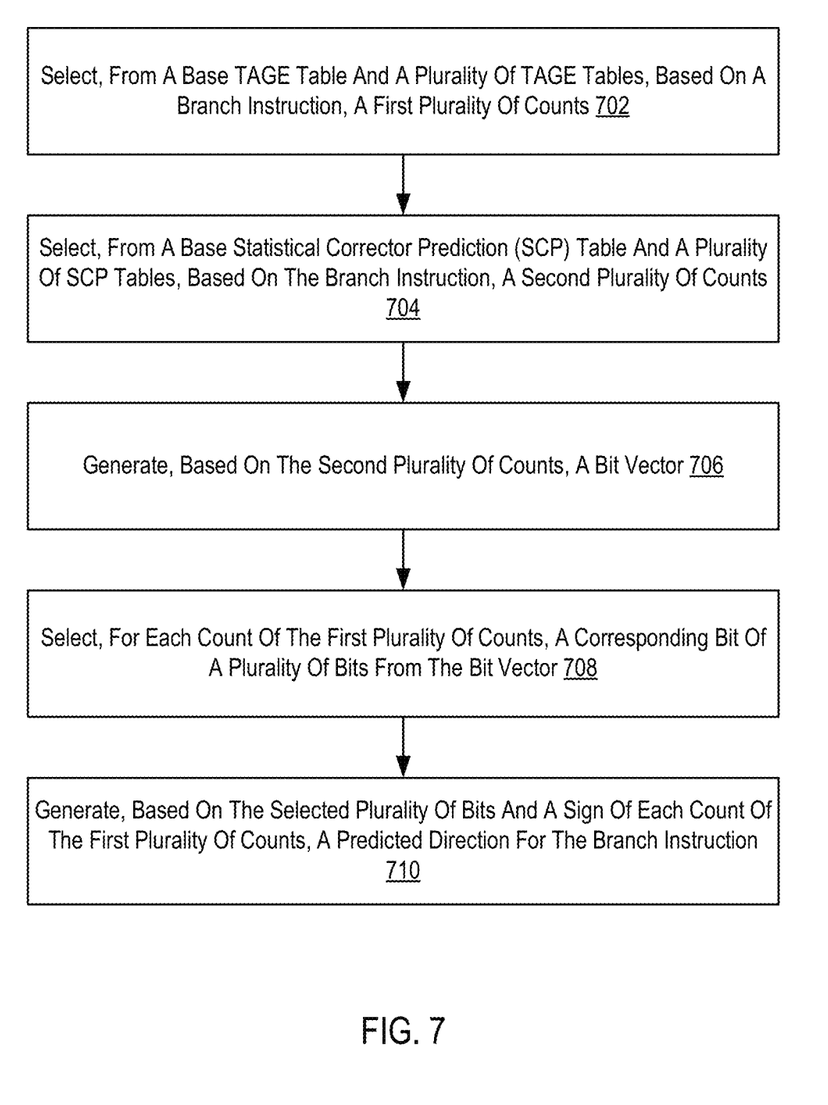
FIG. 7 is a flowchart of an example method for hybrid parallelized tagged geometric (TAGE) branch prediction according to some implementations.

For further explanation, FIG. 7 sets forth a flow chart illustrating an example method for hybrid parallelized tagged geometric (TAGE) branch prediction according to some implementations of the present disclosure. The method of FIG. 7 is implemented, for example, by a branch predictor 102. The method of FIG. 7 includes selecting 702, from a base TAGE table (e.g., a base table 206) and plurality of TAGE tables 204a-n, based on a branch instruction, a first plurality of counts. Selecting the first plurality of counts includes selecting entries from the base table 206 and the plurality of TAGE tables 204a-n based on index values, with the plurality of counts corresponding to the counter values of the selected entries. The first plurality of counts are selected based on the branch instruction in that each index is calculated at least using the address of the branch instruction.

The method of FIG. 7 also includes selecting 704, from a base SCP table (e.g., a base table 306) and a plurality of SCP tables 304a-m, based on the branch instruction, a second plurality of counts. The second plurality of counts are selected based on the branch instruction in that the second plurality of counts correspond to table entries selected using indexes calculated at least using the address of the branch instruction. In some implementations, selecting 702 the first plurality of counts and selecting 704 the second plurality of counts are performed as part of a same branch prediction pipeline stage.

The method of FIG. 7 also includes generating 706, based on the second plurality of counts, a bit vector (e.g., a vector 414). For example, the second plurality of counts are provided as input to logic 412 in order to generate the bit vector. In some implementations, one or more Asel values from a base table 306 are also provided to the logic 412 to generate the bit vector. Each entry of the bit vector corresponds to a particular possible counter value for the first and second plurality of counters. For example, assuming that the branch predictor 102 uses three-bit counters having eight possible values, the bit vector has eight entries. Each index in the bit vector corresponds to a possible value for the counters. For example, for bit vector of N entries, index "0" will correspond to a lowest possible counter value and index "N−1" will correspond to a highest possible counter value.

The method of FIG. 7 also includes selecting 708, for each count of the first plurality of counts, a corresponding bit of a plurality of bits from the bit vector. For example, assume that the bit vector is provided as input to a MUX 416 corresponding to a base table 206 and as input to MUX 418a-n each corresponding to a TAGE table 204a-n. A count from the first plurality of counts that corresponds to the base table 206 is provided as a selection signal to the MUX 416.

Counts corresponding to the plurality of TAGE tables 204a-n are each provided as selection signals to a respective MUX 418a-n. Thus, the plurality of bits are selected as the outputs of the MUX 416,318a-n.

The method of FIG. 7 also includes generating 710, based on the selected plurality of bits and a sign of each count of the first plurality of counts, a predicted direction for the branch instruction. As is set forth above, each count from the first plurality of counts is used to select a particular bit from a bit vector. The sign of each count and the corresponding selected bit are provided to an exclusive-NOR (XNOR) function (e.g., XNOR 420,322a-n). In some implementations, the output of each XNOR is provided to each of two multiplexers (e.g., MUX 424a,b). In some implementations, the output of each MUX 324a,b is provided to another MUX 428. The MUX 428 outputs, as the predicted direction, a prediction 402. In some implementations, the particular value output by the MUX 428 is selected using confidence logic 222 applied to count corresponding to a highest order of the base table 206 and the TAGE tables 204a-n. For example, a selector 216 selects a first and second highest order table from the base table 206 and the TAGE tables 204a-n. An indication of the first highest order table is output as a selection signal to the MUX 426a and MUX 424a, while an indication of the second highest order table is output as a selection signal to the MUX 426b and MUX 424b. As set forth above, the selected outputs of the MUX 424a,b are provided as inputs to a MUX 428 whose final output prediction 402 serves as the predicted direction for the branch instruction.

Figure 8:
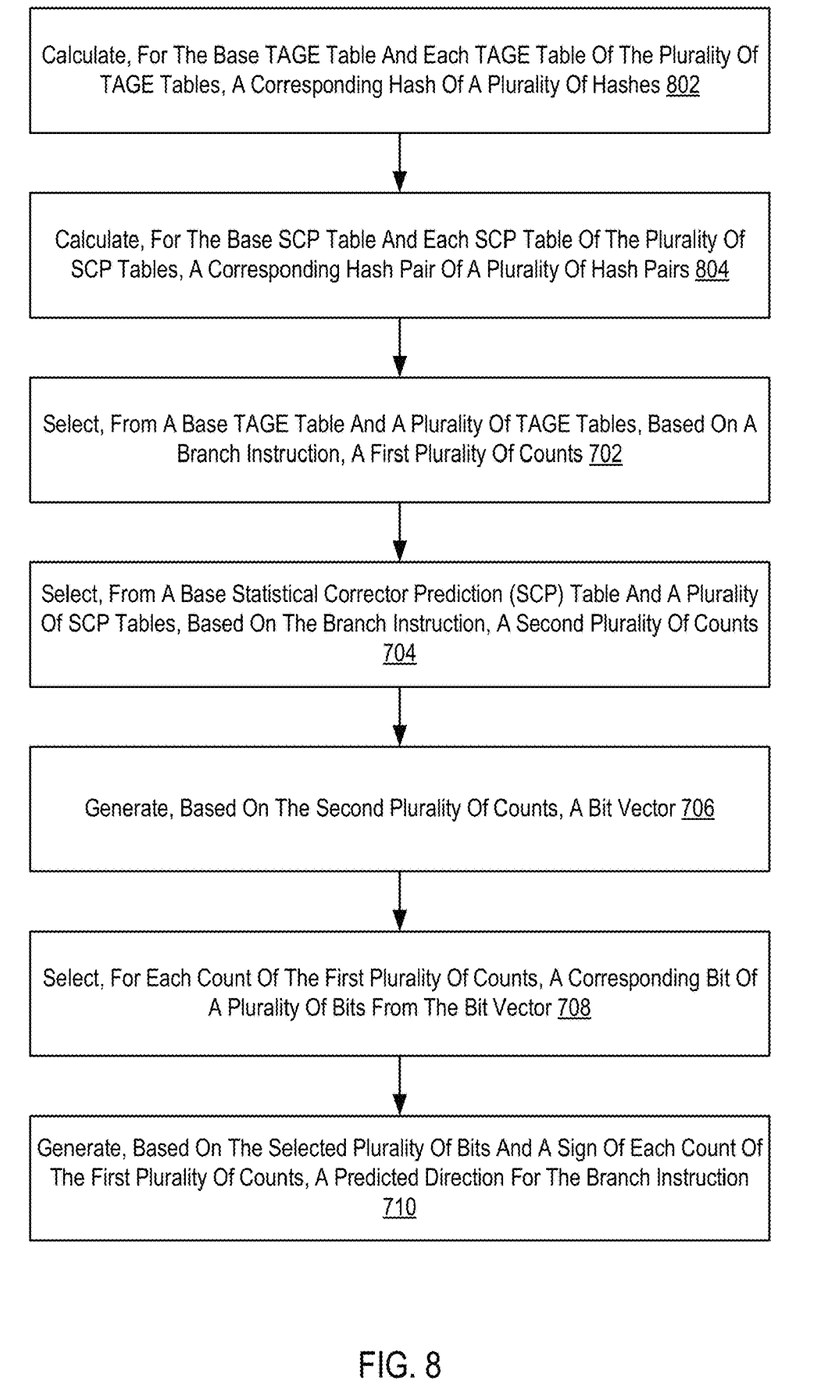
FIG. 8 is a flowchart of another example method for hybrid parallelized tagged geometric (TAGE) branch prediction according to some implementations.

For further explanation, FIG. 8 sets forth a flow chart illustrating an example method for hybrid parallelized tagged geometric (TAGE) branch prediction according to some implementations of the present disclosure. The method of FIG. 8 is similar to FIG. 7 in that the method of FIG. 8 includes selecting 702, from a base TAGE table (e.g., a base table 206) and plurality of TAGE tables 204a-n, based on a branch instruction, a first plurality of counts; selecting 704, from a base SCP table (e.g., a base table 306) and a plurality of SCP tables 304a-m, based on the branch instruction, a second plurality of counts; generating 706, based on the second plurality of counts, a bit vector; selecting 708, for each count of the first plurality of counts, a corresponding bit of a plurality of bits from the bit vector; and generating 710, based on the selected plurality of bits and a sign of each count of the first plurality of counts, a predicted direction for the branch instruction.

The method of FIG. 8 differs from FIG. 7 in that the method of FIG. 8 includes calculating 802, for the base TAGE table (e.g., the base table 206) and each table of the plurality of TAGE tables 204a-n, a corresponding hash of a plurality of hashes. A first hash of the plurality of hashes is used to index the base table 206 for selecting a count in the first plurality of counts. The remaining hashes of the plurality of hashes are used to index the plurality of TAGE tables 204a-n in selecting their respective counts in the first plurality of counts. For example, in some implementations, the hash for the base table 206 is calculated as a function of an address 208 of the branch instruction. As another example, in some implementations, the hashes for the TAGE tables 204a-n are calculated as a function of the address and portions of history 205 (e.g., direction history, path history, local history, or combinations thereof) that increase in size according to a geometric sequence.

The method of FIG. 8 also includes calculating 804, for the base SCP table (e.g., the base table 306) and each SCP table of the plurality of SCP tables, a corresponding hash pair of a plurality of hash pairs. A first hash pair of the plurality of hash pairs is used to index the base table 306 to select two counts for the second plurality of counts. A first hash in the first hash pair is generated based on the address 208 and a TAGE direction bit value of "1" and a second hash in the first hash pair is generated based on the address 208 and a TAGE direction bit value of "0". Each hash pair of the remaining hash pairs is used to index an SCP table 304a-m. Each hash pair of the remaining hash pairs includes a first hash generated based on the address 208, a portion of history 205, and a TAGE direction bit value of "1," and also includes a second hash generated based on the address 208, the portion of history 205, and a TAGE direction bit value of "0." In some implementations, calculating 802 the plurality of hashes and calculating 804 the plurality of hash pairs is performed during the same branch prediction pipeline stage.

Although the implementations above are described within the context of TAGE and SCP branch predictions performed in parallel to generate a branch prediction, one skilled in the art will appreciate that, in some implementations, other branch predictors maintaining different tables or histories are usable instead of an SCP branch predictor.

In view of the explanations set forth above, readers will recognize that the benefits of hybrid parallelized tagged geometric (TAGE) branch prediction include improved performance of a computing system by allowing for parallel TAGE and SCP branch prediction, reducing the number of branch prediction pipeline stages needed to generate the branch prediction.

Exemplary implementations of the present disclosure are described largely in the context of a fully functional computer system for hybrid parallelized tagged geometric (TAGE) branch prediction. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A method of hybrid parallelized tagged geometric (TAGE) branch prediction, the method comprising:
selecting, based on a branch instruction, a first plurality of counts from at least one TAGE table and a second plurality of counts from at least one non-TAGE table, wherein selecting the first plurality of counts and the second plurality of counts is performed during a same branch prediction pipeline stage;

selecting, for each count of the first plurality of counts, a corresponding bit of a plurality of bits from a bit vector, wherein the bit vector is based on the second plurality of counts; and generating, based on the bit vector and the selected corresponding bits, a branch prediction.

2. The method of claim 1, wherein the bit vector comprises a plurality of bits corresponding with a plurality of possible counter values for counters included within each of the at least one TAGE table and the at least one non-TAGE table.

3. The method of claim 2, wherein the at least one non-TAGE table comprises at least one statistical corrector predictor (SCP) table.

4. The method of claim 2, further comprising:
calculating, for the at least one TAGE table, a corresponding hash of at least one hash; and
calculating, for the at least one non-TAGE table, a corresponding hash pair of at least one hash pair.

5. The method of claim 4, wherein calculating the corresponding hash of the at least one hash and calculating the corresponding hash pair of the at least one hash pair are performed during a same branch prediction pipeline stage.

6. The method of claim 4, wherein a first hash of each hash pair is based on a first TAGE direction bit value and a second hash of each hash pair is based on a second TAGE direction bit value.

7. The method of claim 4, wherein the first plurality of counts is selected based on the at least one hash and the second plurality of counts is selected based on the at least one hash pair.

8. A branch predictor for hybrid parallelized tagged geometric (TAGE) branch prediction, the branch predictor comprising:
at least one TAGE table;
at least one non-TAGE table; and
logic configured to:
select, based on a branch instruction, a first plurality of counts from the at least one TAGE table and a second plurality of counts from the at least one non-TAGE table, wherein selecting the first plurality of counts and selecting the second plurality of counts is performed during a same branch prediction pipeline stage;
select, for each count of the first plurality of counts, a corresponding bit of a plurality of bits from a bit vector, wherein the bit vector is based on the second plurality of counts; and
generate, based on the bit vector and the selected corresponding bits, a branch prediction.

9. The branch predictor of claim 8, wherein the selected corresponding bits of the bit vector are provided as input into a plurality of multiplexers.

10. The branch predictor of claim 8, wherein the at least one non-TAGE table comprises at least one statistical corrector predictor (SCP) table.

11. The branch predictor of claim 8, wherein the logic is further configured to:

calculate, for the at least one TAGE table, a corresponding hash of at least one hash; and
calculate, for the at least one non-TAGE table, a corresponding hash pair of at least one hash pair.

12. The branch predictor of claim 11, wherein calculating the corresponding hash of the at least one hash and calculating the corresponding hash pair of the at least one hash pair are performed during a same branch prediction pipeline stage.

13. The branch predictor of claim 11, wherein a first hash of each hash pair is based on a first TAGE direction bit value and a second hash of each hash pair is based on a second TAGE direction bit value.

14. The branch predictor of claim 11, wherein the first plurality of counts is selected based on the at least one hash and the second plurality of counts is selected based on the at least one hash pair.

15. An apparatus for hybrid parallelized tagged geometric (TAGE) branch prediction, comprising:
at least one TAGE table;
at least one non-TAGE table;
computer memory; and
a processor operatively coupled to the computer memory, the processor comprising a branch predictor configured to:
select, based on a branch instruction, a first plurality of counts from the at least one TAGE table and a second plurality of counts from the at least one non-TAGE table, wherein selecting the first plurality of counts and the second plurality of counts is performed during a same branch pipeline stage;
select, for each count of the first plurality of counts, a corresponding bit of a plurality of bits from a bit vector, wherein the bit vector is based on the second plurality of counts; and
generate, based on the bit vector and the selected corresponding bits, a branch prediction.

16. The apparatus of claim 15, wherein a bit in the bit vector indicates whether to override the corresponding count of the first plurality of counts.

17. The apparatus of claim 15, wherein the at least one non-TAGE table comprises at least one statistical corrector predictor (SCP) table, wherein the bit vector is generated based on the second plurality of counts.

18. The apparatus of claim 15, wherein the branch predictor is further configured to:
calculate, for the at least one TAGE table, a corresponding hash of at least one hash; and
calculate, for the at least one non-TAGE table, a corresponding hash pair of at least one hash pair.

19. The apparatus of claim 18, wherein calculating the corresponding hash of the at least one hash and calculating the corresponding hash pair of the at least one hash pair are performed during a same branch prediction pipeline stage.

20. The apparatus of claim 18, wherein a first hash of each hash pair is based on a first TAGE direction bit value and a second hash of each hash pair is based on a second TAGE direction bit value.

* * * * *